March 6, 1934. A. H. PFUND 1,949,619
GLOSSIMETER
Filed Sept. 16, 1932   3 Sheets-Sheet 1

Inventor
A. H. Pfund
By F. B. Wooden.
Attorney.

March 6, 1934.   A. H. PFUND   1,949,619
GLOSSIMETER
Filed Sept. 16, 1932   3 Sheets-Sheet 2
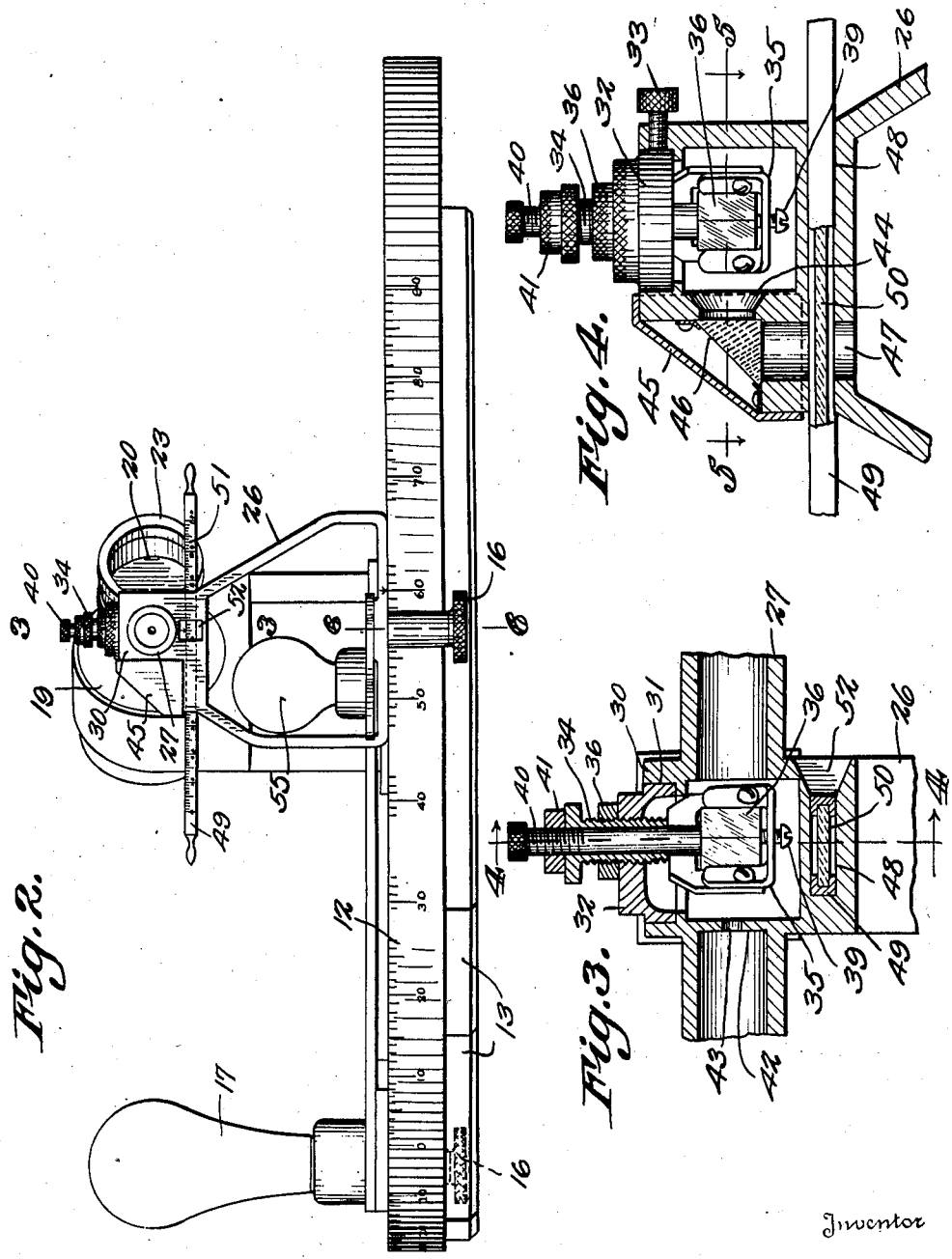
Inventor
A. H. Pfund
By F. B. Wooden
Attorney.

March 6, 1934.    A. H. PFUND    1,949,619
GLOSSIMETER
Filed Sept. 16, 1932    3 Sheets-Sheet 3

Inventor
A. H. Pfund
By F. B. Worden..
Attorney

Patented Mar. 6, 1934

1,949,619

UNITED STATES PATENT OFFICE 1,949,619

GLOSSIMETER

August Herman Pfund, Baltimore, Md.

Application September 16, 1932, Serial No. 633,517

7 Claims. (Cl. 88—23)

This invention relates to optical instruments and has special reference to an instrument for accurately measuring, relative to a standard, the glossiness of a surface, the invention being preferably termed a "Glossimeter."

In order to completely describe the sensation produced by light reflected from any surface it is essential that, in addition to the color characteristics, the amount of gloss or lustre be included in the description.

Gloss or lustre of any surface is here defined as the visual sensation produced by light specularly reflected therefrom. Hence, a measurement of the intensity of the light specularly reflected from any surface is a measurement of the gloss or lustre of that surface.

It is recognized that a highly polished surface will specularly reflect a greater amount of light than will a rough surface. It is further recognized that if two materials, one of a light color and the other of a dark color, have the same surface characteristics the dark one will appear the glossier. Conversely, if two surfaces, one of a light color and the other of a dark color, appear to have the same amount of gloss, their surface characteristics will be vastly different. From these statements it is evident that gloss may be defined in two ways. First, according to the sensation of glossiness (hereinafter called subjective gloss) or, secondly, according to the actual surface conditions (hereinafter called objective gloss.)

Subjective gloss is here defined as the phenomenon (as it appears to the eye) resulting from the ratio of the sum of the specularly reflected light plus the diffusely reflected light to the diffusely reflected light. Subjective gloss is expressed thus:

$$(1) \quad G_s = \frac{I_s + I_d}{I_d}$$

wherein $G_s$=subjective gloss, $I_s$=intensity of the specularly reflected light, and $I_d$=intensity of the diffusely reflected light. Specularly reflected light is here defined as that light reflected at an angle equal to the angle of incidence and opposite in direction. Diffusely reflected light is here defined as that light reflected at angles different from the angle of incidence.

Objective gloss is a function of the surface texture, and is here defined as the ration of the intensity of the light specularly reflected from a surface to the intensity of the light specularly reflected from a perfectly polished surface of the same material. Objective gloss is expressed thus:

$$(2) \quad G_o = \frac{I_s}{I_{std}}$$

wherein $G_o$=objective gloss, $I_s$=intensity of the light specularly reflected from the sample, and $I_{std}$=intensity of the light specularly reflected from a perfectly polished surface of the same material.

Furthermore, for the better understanding of the invention, the term relative gloss as used herein is to be taken as the ratio between a perfectly polished surface of the material in question and a perfectly polished surface of a standard material. It has been found that perfectly polished glass forms such a standard.

One important object of the invention is, therefore, to provide a novel apparatus whereby the relative ratio between a perfectly polished surface of a given material and the surface of a second sample of the same material may be determined both for objective and subjective glossiness or for either objective or subjective glossiness as may be desired.

A second important object of the invention is to provide a novel apparatus whereby the ratio of glossiness of a surface under examination may be compared to a standard surface constituting the norm to which, as having maximum gloss both subjective and objective, all other surfaces are referred to for comparison.

A third important object of the invention is to provide a novel instrument of this type whereby the glossiness of the surfaces of two samples of the same material may be readily compared.

A fourth important object of the invention is to provide a novel device for the purpose having means whereby the average glossiness of a surface may be determined with reference to a standard, the device being equally well adapted for cylindrical and flat surfaces.

With the above and other objects in view as will be hereinafter apparent, the invention consists in general of certain novel details of construction and combinations of parts hereinafter fully described, illustrated in the accompanying three sheets of drawings, and specifically pointed out in the appended claims.

In the accompanying drawings, wherein like characters of reference indicate like parts in the several views, Figure 1 is a plan view of an instrument constructed in accordance with this invention, a portion of the table or base being broken away.

Figure 2 is an elevation thereof taken on a plane at right angles to the line of collimation of the telescope shown in Figure 1.

Figure 3 is an enlarged detail section on the line 3—3 of Figure 2.

Figure 4 is a section on the line 4—4 of Figure 3.

Figure 1:
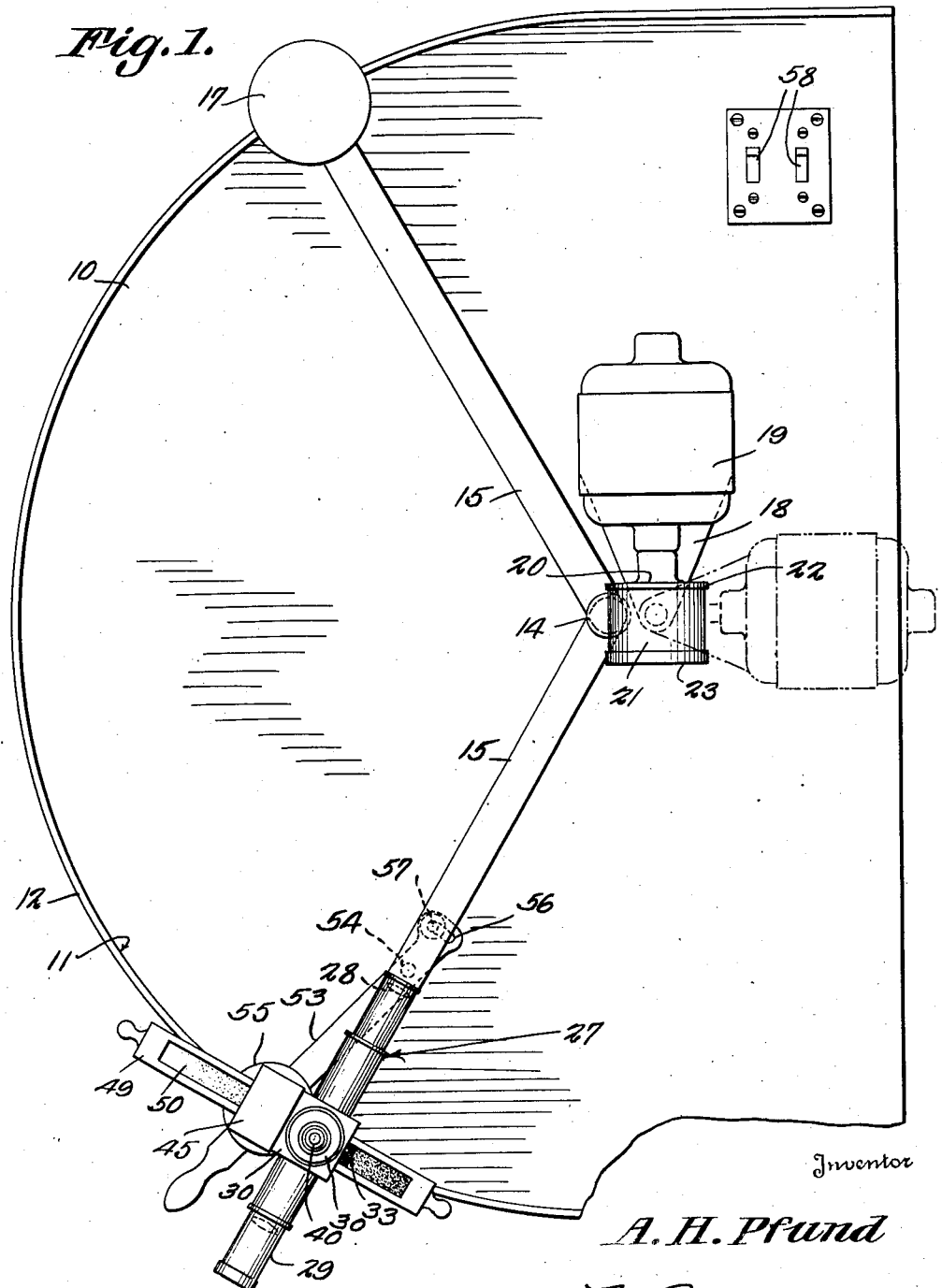

The base or table of the invention includes a flat platform 10 having a semicircular edge 11 around which extends a scale 12 graduated in circular measure both ways from a zero line. Ribs 13 serve to support the table in spaced relation to the surface upon which it rests. A pivot pin 14 is located at the center of the semicircle and on this pivot pin are mounted the inner ends of a pair of independently movable arms 15. The outer ends of these arms project over the arcuate edge of the table and scale and clamp screws 16 are carried by these ends and serve to hold the arms in angularly adjusted relation to the zero line. On the outer end of one of these arms is mounted a lamp 17 constituting a primary light source.

Figure 8:
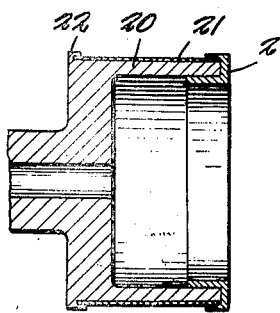
Figure 8 is a diagrammatic section through the sample holder used herein carrying a cylindrical sample.
Figure 10:
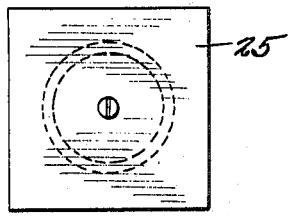
Figure 10 is a face view of the sample shown in Figure 9.
Figure 9:
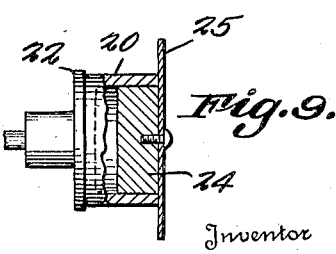
Figure 9 is a similar view on a somewhat smaller scale showing the sample holder supporting a flat sample.

Pivoted adjacent the pin 14 is one end of a bracket 18 whereon is mounted an electric motor 19. Fixed on the shaft of this motor is a drum 20 (see Figure 8) around which may be wrapped a specimen 21 to be examined. The drum is provided with an undercut ring 22 fixed at one end to hold one edge of the specimen and with a slip ring 23 to hold the other edge. The diameter of the drum is such that, with the bracket in the position shown in full lines in Figure 1, the surface of the specimen will be tangent to the axis of the pivot pin 14. A plug 24 is adapted to fit in the end of the drum and to carry a flat specimen 25 in such position that when the bracket is in the dotted line position of Figure 1 the surface under examination will be tangent to the axis of the pin 14.

Figure 5:
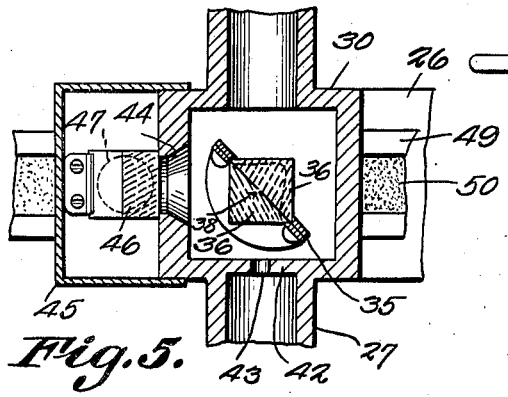
Figure 5 is a section on the line 5—5 of Figure 4.
Figure 6:
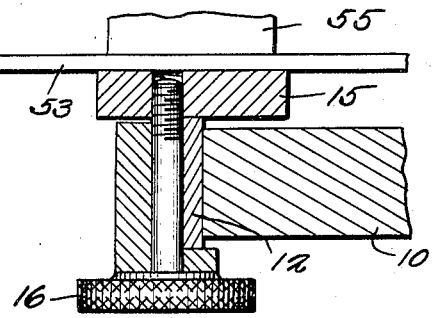
Figure 6 is an enlarged detail section on the line 6—6 of Figure 2.
Figure 7:
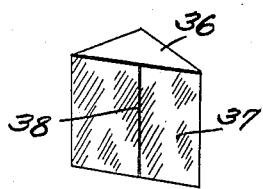
Figure 7 is a detail perspective of a reflecting prism used herein.

Mounted on the remaining arm 15 is an open frame forming a bracket 26. Supported on top of this bracket is a telescope 27 having its line of collimation in a vertical plane extending radially of the tangent line of the pin 14 to the specimen. This telescope has the usual objective lens 28 and eye piece 29 and is arranged for focussing on the specimen in the usual manner. Intermediate its ends the telescope tube is provided with a rectangular casing or enlargement 30 provided with an eccentrically bored bearing 31 at its upper end. An eccentric 32 is fitted in the opening 31 and is held adjusted therein by means of a screw 33. A threaded sleeve nut 34 is screwed vertically through the eccentric and carries at its lower end a prism holder 35 which can thus be adjusted vertically, a lock nut 36 being used to prevent accidental movement. Also the sleeve 34 permits the holder to be rotated on a vertical axis. Mounted in the holder is a double glass prism each half 36 of which forms a triangular right prism whose base is a right isosceles triangle, the hypothenuses of the triangles being in contact so that the combined triangular prisms form a double prism having a square base. The hypothenuse face of one of the triangular prisms is silvered, as at 37, except for a narrow unsilvered streak 38 running vertically through the center of the face. The holder is arranged to grip opposite corners of the triangular prisms, as may be seen in Figure 5, and the prisms are adjustable vertically in the holder by means of a bottom screw 39 and a top screw 40, which latter extends through the sleeve and is provided with a lock nut 41. A diaphragm 42 is arranged at the connection of one part of the telescope tube to one side of the enlargement, which, for purposes of convenience, may be termed the double prism housing, and is provided with an opening 43. At one side of the double prism housing is an inwardly flared opening 44 which leads to a single or secondary prism housing 45 wherein is mounted a horizontally disposed right triangular prism 46 having its two right angularly disposed sides in horizontal and vertical planes respectively. The third side is arranged at 45° to the horizontal and is highly polished or otherwise treated to form a standard reflecting surface. The housing 45 is provided with a bottom opening 47 which is intersected by a horizontal guide slot 48 extending transversely of the telescope. In this slot 48 slides a frame 49 carrying a photometric wedge 50 transparent at one end and gradually and regularly decreasing in transparency to the other end. A scale 51 is formed on one longitudinal edge of the frame and moves past an index visible through a window 52, as shown in Figure 2.

An arm 53 is pivoted at 54 to the telescope carrying arm 15 and supports a secondary lamp 55 which is positioned to throw light upwardly through the opening 47, the pivoting of the arm permitting adjustment of the lamp relative to said opening. The arm 53 is provided with a transverse slot 56 wherethrough passes a clamp screw 57 by which the arm 53 may be held in adjusted position relative to the arm 15.

Figure 12:
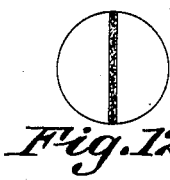
Figure 12 is a view showing the appearance of a sample under inspection with the photometric wedge used herein in full light position.
Figure 13:
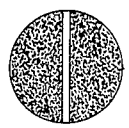
Figure 13 is a view similar to Figure 12 but with the wedge positioned to cut off the maximum of light.
Figure 14:
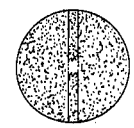
Figure 14 is a similar view with the wedge in an intermediate position.
Figure 11:
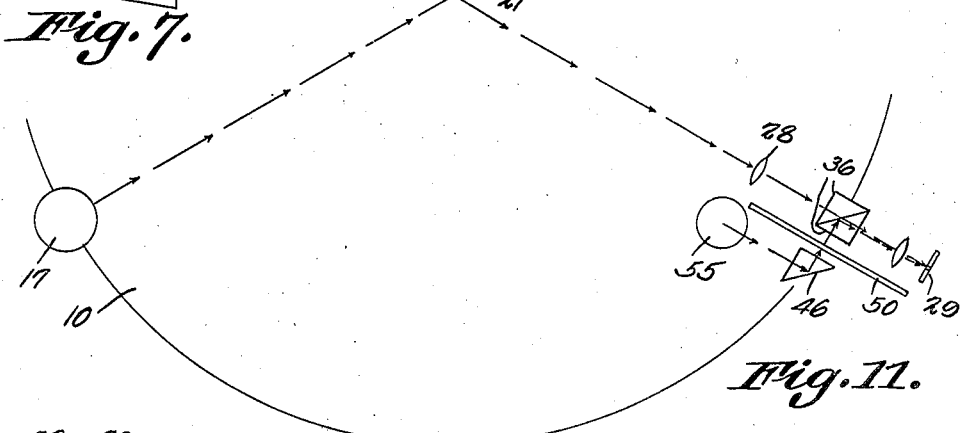
Figure 11 is a diagram showing the light paths in the instrument.

In using the device for measuring objective gloss the telescope carrying arm 15 is adjusted at a desired angle to the specimen mounted on the drum, this angle being preferably about 80° from a line normal to the specimen to eliminate the effects due to color. The double prism is adjusted, if necessary, so that the line of collimation passes through the slot or streak 38. The primary lamp arm 15 is then swung until it is at the same angle as the telescope arm but on the opposite side of the normal line, care being taken to have the light beam at such an angle as to reflect from the sample along the line of collimation of the telescope. The motor is started, switches 58 being provided to control the motor and lights. The photometric wedge is then adjusted, longitudinally. When this wedge has its completely transparent end in registry with the opening 47 the appearance of the field as viewed, with a sample not perfectly reflective, will be somewhat like that shown in Figure 12, an apparently dark streak bisecting a luminous field. With the densest part of the wedge exposed, the appearance will be that of an apparently light streak bisecting a dark field, as shown in Figure 13. In an intermediate position of the wedge, the appearance may be that shown in Figure 14. By shifting the wedge until the field and streak are indistinguishable the amount of light cut off by the wedge will be equal to the loss of light due to absorption by the surface of the sample. By properly calibrating the wedge scale and the utilization of standard lamps the gloss or reflective property of the sample may thus be measured in terms of the total reflection by the standard reflecting surface, here shown as the diagonal surface of the glass prism 46. Obviously, a standard surface of the material to be tested may be compared with the standard glass prism and then a sample other than the standard may be compared with the standard glass prism. The objective gloss of the tested sample may then be obtained by the use of Formula (2).

To obtain the subjective gloss the only changes necessary are to move the primary lamp into position so that its beam is normal to the sample, the telescope remaining as before, and the adjustment of the wedge to the new conditions to obtain a uniformly luminous field. By Formula (1) the subjective gloss may then be calculated.

For practical purposes both the objective gloss and the subjective gloss may be read in direct terms of the standard glass prism surface since samples to be matched can equally well be compared with this surface as with a standard surface of the material itself.

The device has a wide range of uses such as determining or matching the glossiness of silks and other fabrics, paints and wood polishes, metal surfaces, and many others. It will also be noted that the spinning of the sample by the motor ensures the measurement of the average glossiness of the sample under examination.

There has thus been provided a device of the character described and for the purpose specified which is both simple in construction and efficient in operation.

It is, of course, obvious that minor changes may be made in the form and construction of the invention without departure from the material spirit thereof. It is not, therefore, desired to confine the invention to the exact form herein shown and described, but it is desired to include all such as properly comes within the scope of the following claims.

What is claimed as new, is:—

1. In a device of the kind described, a platform having a portion of its periphery forming a semi-circular edge, said edge being graduated in both directions from the center of its length, a pair of arms pivoted concentric to said edge and independently movable about the pivot point, said arms projecting to said edge and being provided with index markings traversing the graduations as the arms are moved, a light source mounted on one of the arms, a telescope mounted on the other arm with its line of collimation radial to the pivotal axis of the arms, and a sample holder mounted on the platform and arranged to hold a sample in a position tangential to said pivotal axis and at right angles to the radial line from said axis to the central point of the graduated edge.

2. In a device of the kind described, a platform having a portion of its periphery forming a semi-circular edge, said edge being graduated in both directions from the center of its length, a pair of arms pivoted concentric to said edge and independently movable about the pivot point, said arms projecting to said edge and being provided with index markings traversing the graduations as the arms are moved, a light source mounted on one of the arms, a telescope mounted on the other arm with its line of collimation radial to the pivotal axis of the arms, a motor pivoted on said platform in the continuation of the radial line connecting the middle point of the graduated edge and the pivot point of the arms, said motor being arranged to swing between positions respectively aligned with and at right angles to the line on which it is mounted, and a sample carrier carried by the motor shaft and movable to bring its end and side respectively into juxtaposition to the pivotal axis of the arms as the motor is moved from one to the other of its positions.

3. In a device of the kind described, a telescope having a tube provided with a chamber intermediate the eye piece and object glass ends of the telescope, a prism holder in said chamber having an upwardly extending threaded shank, a circular closure mounted rotatably in the upper end of the chamber and having said threaded shank extending eccentrically therethrough whereby the holder may be adjusted with respect to the line of collimation of the telescope in lateral direction, means to secure the closure in adjusted position, and prism means carried by the holder.

4. In a device of the kind described, a telescope having a tube provided with a chamber intermediate the eye piece and object glass ends of the telescope, a prism holder in said chamber having an upwardly extending threaded shank, a circular closure mounted rotatably in the upper end of the chamber and having said threaded shank extending eccentrically therethrough whereby the holder may be adjusted with respect to the line of collimation of the telescope in lateral direction, means to secure the closure in adjusted position, a double prism in said holder, and adjusting screws for vertically adjusting the prism in the holder including a lower screw threaded through the bottom of the holder and an upper screw extending through the threaded shank.

5. In a device of the kind described, a telescope having a tube provided with a chamber intermediate the eye piece and object glass ends of the telescope, a prism holder in said chamber having an upwardly extending threaded shank, a circular closure mounted rotatably in the upper end of the chamber and having said threaded shank extending eccentrically therethrough whereby the holder may be adjusted with respect to the line of collimation of the telescope in lateral direction, means to secure the closure in adjusted position, a double prism mounted in said holder, said chamber having a light opening in one of its sides, a lamp, and means to direct light from the lamp through the opening onto said double prism.

6. In a device of the kind described, a telescope having a tube provided with a chamber intermediate the eye piece and object glass ends of the telescope, a prism holder in said chamber having an upwardly extending threaded shank, a circular closure mounted rotatably in the upper end of the chamber and having said threaded shank extending eccentrically therethrough whereby the holder may be adjusted with respect to the line of collimation of the telescope in lateral direction, means to secure the closure in adjusted position, a double prism mounted in said holder, an opened bottomed auxiliary chamber at the side of the first chamber and having port communication therewith, a lamp below the opening in the bottom of the auxiliary chamber, and a reflector in the auxiliary chamber reflecting light from the lamp onto the double prism.

7. In a device of the kind described, a telescope having a tube provided with a chamber intermediate the eye piece and object glass ends of the telescope, a prism holder in said chamber having an upwardly extending threaded shank, a circular closure mounted rotatably in the upper end of the chamber and having said threaded shank extending eccentrically therethrough whereby the holder may be adjusted with respect to the line of collimation of the telescope in lateral direction, means to secure the closure in adjusted position, a double prism mounted in said holder, an opened bottomed auxiliary chamber at the side of the first chamber and having port communication therewith, a lamp below the opening in the bottom of the auxiliary chamber, a reflector in the auxiliary chamber reflecting light from the lamp onto the double prism, and a light screen gradually increasing in transparency from end to end and slidably interposed between the lamp and reflector.

A. HERMAN PFUND.